United States Patent
Morrison

(10) Patent No.: US 10,108,066 B2
(45) Date of Patent: Oct. 23, 2018

(54) ELECTRONIC DISPLAY INK HAVING INERT PIGMENT PARTICLES

(71) Applicant: Owen Research Corporation, Anton, MA (US)

(72) Inventor: Ian D. Morrison, Acton, MA (US)

(73) Assignee: Owen Research Corporation, Anton, MA (US)

( * ) Notice: Subject to any disclaimer, the term of this patent is extended or adjusted under 35 U.S.C. 154(b) by 763 days.

(21) Appl. No.: 14/405,349

(22) PCT Filed: May 31, 2013

(86) PCT No.: PCT/US2013/043606
§ 371 (c)(1),
(2) Date: Dec. 3, 2014

(87) PCT Pub. No.: WO2013/184507
PCT Pub. Date: Dec. 12, 2013

(65) Prior Publication Data
US 2015/0115208 A1    Apr. 30, 2015

Related U.S. Application Data

(60) Provisional application No. 61/655,185, filed on Jun. 4, 2012.

(51) Int. Cl.
*G02F 1/167*    (2006.01)
(52) U.S. Cl.
CPC ...... *G02F 1/167* (2013.01); *G02F 2001/1678* (2013.01)
(58) Field of Classification Search
USPC ......... 430/114; 106/31.13; 252/500; 359/296
See application file for complete search history.

(56) References Cited

U.S. PATENT DOCUMENTS

| | | | |
|---|---|---|---|
| 4,285,801 A | | 8/1981 | Chiang |
| 5,102,763 A | * | 4/1992 | Winnik .............. G03G 9/08791 430/108.21 |
| 6,117,368 A | | 9/2000 | Hou |
| 6,806,013 B2 | | 10/2004 | Morrison et al. |
| 6,842,657 B1 | | 1/2005 | Drzaic et al. |
| 7,199,177 B2 | | 4/2007 | Auschra et al. |
| 7,245,414 B2 | | 7/2007 | Liang et al. |
| 7,715,088 B2 | | 5/2010 | Liang et al. |
| 7,901,503 B2 | | 3/2011 | Vilner |
| 8,115,729 B2 | | 2/2012 | Danner et al. |
| 8,540,359 B2 | * | 9/2013 | Zhou .................... C09D 7/1275 106/31.13 |
| 2003/0137717 A1 | * | 7/2003 | Albert .................. G02B 26/026 359/296 |
| 2006/0125363 A1 | | 6/2006 | Tahira et al. |
| 2012/0008188 A1 | | 1/2012 | Telfer et al. |
| 2012/0092753 A1 | | 4/2012 | Heikenfeld et al. |

FOREIGN PATENT DOCUMENTS

JP    2011075904 A    4/2011
WO    2000038000 A1    6/2000

OTHER PUBLICATIONS

Influence of surfactant structure on reverse micelle size and charge for non-polar electrophoretic inks, (Parent et al.), Jul. 21, 2011, Article.
Electrophoresis of Display Pigments and DNA in Nonpolar Media, (Schneider et al.) Jul. 6, 2012, website page reu.materials.cmu.edu/projects/2012_13.html.
Colloid Systems and Interfaces Stability of Dispersions through Polymer and Surfactant Adsorption, (Somasundaran et al.), Handbook of Surface and Colloid Chemistry, pp. 155-196, 2009.
Chapter I About Binders, Jul. 6, 2012, website page www.dotapea.com/english/chap01binders.htm.

* cited by examiner

*Primary Examiner* — Monique R Peets
(74) *Attorney, Agent, or Firm* — Seann P. Lahey

(57) ABSTRACT

The ink of the present invention is an oil dispersion of pigment particles. The pigment particles are designed to have no or insignificant response to applied electric fields. The ink comprises a carrier liquid having a concentration of pigment particles disposed in the carrier liquid. A surfactant is included in the carrier liquid, wherein the surfactant is adsorbed on the pigment particles only when activated. The pigment particles having adsorbed the surfactant do not generate a reactive level of particle charge so that the pigment particles move with and not independently from the carrier liquid under an applied electrical field. The surfactant is activated by the application of at least one of heat and solvent to the carrier liquid so that the surfactant molecules adsorb onto the pigment particles.

20 Claims, 3 Drawing Sheets

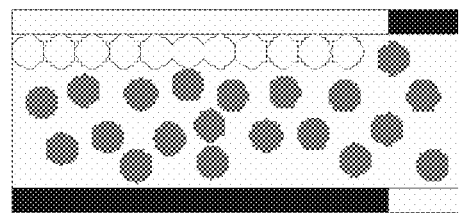
Figure 3A
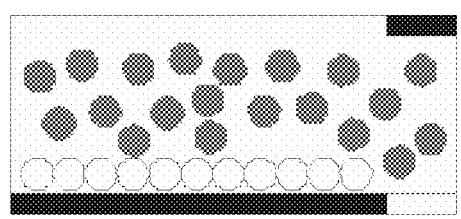
Figure 3B
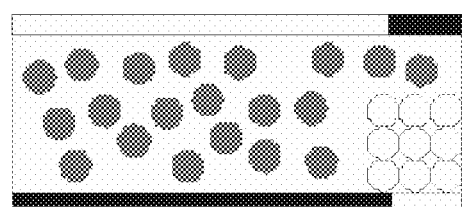
Figure 3C
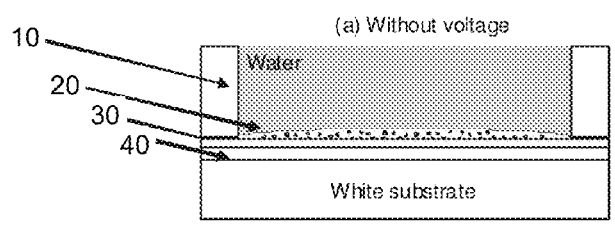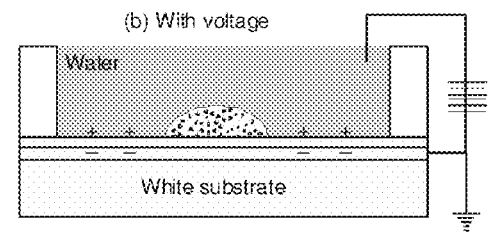
Figure 4A          Figure 4B

ELECTRONIC DISPLAY INK HAVING INERT PIGMENT PARTICLES

BACKGROUND OF THE INVENTION

1) Field of the Invention

The present invention relates to new inks and ink making processes useful in environments such as electronic displays, especially full color displays. These new inks are especially useful for electronic displays that use reflected light, like electrowetting displays and electrophoretic displays. The pigment particles in the inks are designed to have no or insignificant response to applied electric fields, thus allowing the pigment particles to move with and not independently from the carrier liquid under an applied electrical field. These inks can be used to replace existing types of dye solutions in electronic displays.

2) Description of Related Art

Stable dispersions of pigment particles in oil can be formulated with nonaqueous ionic dispersants which impart charge on the pigment particles by the preferential adsorption of either cations or anions. These dispersions are called electrocratic as well. This charging of pigment particles in oil is necessary in electrophoretic displays since it is the movement of charged particle through the oil that produces the change in optical state.

Stable dispersions of pigments in oil can be formulated with nonionic dispersants which should not impart significant charge on the pigments. However, pigment particles dispersed with nonionic surfactants have been found to be slightly charged. These charges are not screened by ions in the oil and so the pigment particles respond to electric fields.

Charged particles in oil, even just slightly charged, will move when electric fields are applied. They exhibit two types of motion: electrophoresis and field induced chaining (sometimes called dielectrophoresis). Electrophoresis causes the charged particles to move. They can move and stick to electrodes and to viewing surfaces.

Field induced chaining can arise in dispersions of polarizable particles when the surfaces of those particles can touch. The particles are held in a chain by the coupling of their field-induced polarizations. This chaining arises because many pigments are more electrically conductive than oils. This is especially significant for dispersions of carbon blacks which are highly desirable in displays because of their optical density.

Charging of pigment particles in oil is deleterious in electrowetting displays since it is the movement of the liquid that produces the change in optical state and independent motion of the pigment is deleterious. For example, if the pigment particles are charged, then the application of an electric field causes the pigment particles to stick to the electrode and prevent or significantly degrading the change in optical state as the liquid moves away.

The reason that nonaqueous surfactants generate ionic charges is that they contain a moiety to cause the surfactant to adsorb to the pigment particle surface. For nonaqueous dispersions, this is usually highly polar, hence charge generating chemistries.

Electronic displays have circuitry to "address" individual pixels across a surface. These signals change the optical properties of the pixels, thus creating the image. Some displays are emissive—that is, the pixels emit light when addressed. Some displays are passive—that is, the pixels modulate light, not create it.

Liquid crystal displays (LCDs) create an image by modulating light as it passes through a layer of liquid crystals by changing the arrangement of the crystals. An important feature of LCDs to note is that the imaging process is separate from the color producing process. A consequence of the separation of image formation and color production is that both contribute to the loss of light and hence reduce the optical efficiency of the display. LCDs often require bright rear illumination to produce a color image. The bright illumination requires extra power, especially in brightly lit environments.

Electrowetting displays (EWDs) have pixels that include ink to modulate the color and intensity of light coming from a light source in the rear or incident light reflected off the back surface. The electrowetting ink is a dyed oil solution submersed in a clear water phase. The switching comes after a voltage is applied to the pixel and the low dielectric oil phase contracts allowing the higher dielectric water phase to move closer to the electrode. In EWDs, a liquid phase changes position to change optical properties.

Electrophoretic displays (EDPs) use ink that is a dispersion of at least one type of pigment particle in a low dielectric, insulating oil, generally a low molecular weight hydrocarbon, with an oil-soluble component added to control the electric charge on the pigment particle. For example, an arrangement of white particles in oil dyed blue. In a given pixel, an applied electric field can move the particles to the top (viewing) surface creating a white state, and alternatively move the particles to the rear surface creating a blue state from the dye. Thus, the creation of images with these inks follows from the ability to control the position of the charged pigment particles by applying an electric field.

An advantage of pigment-base ink displays over LCDs is that the image modulation and the color production are combined in one layer. The inherent brightness of such a construction enables these EPDs and EWDs to be used in ambient light, the same as printed images can be read from room light to bright sunshine. However, the inks for EPDs and EWDs have a serious disadvantage in that the dyes available are not sufficiently light-stable. That is, the dye fades with exposure to ambient light.

Other known EPDs contain two types of particles instead of particles and a dye. Generally one color of particles is positively charged and the other color negatively charged. These are called dual particle electrophoretic displays and generally contain no dye in the oil. For example, the dispersion contains two sets of particles, say white and black, in a transparent liquid. The ink could have positive white particles of charge −q and negative black particles of charge +q. The dual particle dispersions use two pigments, both of which are more light stabile than dyes, so that these displays can be used in ambient light in the same way printed images can be read. These inks provide stability to light exposure. However, having two different sets of oppositely charged particles is highly complex.

An important characteristic of the pigments used in EPDs is that the charges on the particles be well controlled. After all, it is the ability of an applied electric field to control the position of the pigment particles that enables the individual pixels to be controlled and images to be formed. For dual particle displays, the two colors of pigment particles must have well separated electric charge so the two different colors can be well separated. However there is also a need for uncharged pigment particles which enable other imaging processes. For example, the combination of charged white particles and uncharged pigment particles in an ink for an electrophoretic display could be used to produce a bright white state and a bright color state. Creating dispersions of pigments without significant electric charge in oils is a challenge not successfully addressed in the prior art.

Using pigment particles in displays rather than dyes is preferred for several reasons, two of which are: (1) the light fastness of pigments is superior to dyes and (2) the optical densities of pigment dispersions can be much greater than dye solutions. However, pigments have not been used in EWDs because, when the known surfactants are added to disperse the pigment particles, the particles become electrically charged. The charged pigment particles respond to the electric fields used in EWDs and move. The motion of the particles is not the same as the motion of the liquids. For example, the particles may move towards the electrode and stick. This leaves a residual color on the electrode and substantially degrades the optical performance of the display. Particles can chain in an electric field and prevent the liquid from moving at all.

Methods and materials to disperse pigments in the oils of EWD inks and not have the pigments respond to electric charge are needed.

In general pigments of different colors have different chemistries at their surfaces. This requires different kinds of reactive chemicals to treat the surfaces. For those skilled in the art of dispersions in oils it is also known that for adsorption of chemicals on the surface there must be some strong interactions between the soluble species and the pigment surface. This may vary from pigment chemistry to pigment chemistry and so different soluble chemicals are needed. These are sometimes antagonistic to each other and useful mixtures of pigments with different treatments are not possible.

What is needed are materials and methods, each of which can treat a wide variety of pigment chemistries.

What is needed are materials and methods to treat conductive pigments like carbon black so that electrical effects are eliminated.

What is needed are materials and methods to treat all pigments without creating electric charges on the particles, even in the presence of other chemical components in the oil.

Accordingly, it is an object of the present invention to enable the use of a single surfactant to disperse multiple kinds of pigment particles.

Accordingly, it is an object of the present invention to disperse pigment particles in oils without significant charge.

Accordingly, it is an object of the present invention to provide inks for electronic displays.

Accordingly, it is an object of the present invention to combine the image formation and color production of a display pixel in one layer by using the position of color pigment particles in a carrier liquid to modulate the image.

Accordingly, it is an object of the present invention to provide inks for use in electronic displays with stability to light exposure.

SUMMARY OF THE INVENTION

The present invention discloses an entirely new type of ink. The discoveries detailed herein related to the materials and methods used to disperse pigment particles in a carrier liquid, but those pigment particles do not respond to applied electric fields.

For those skilled in the art of electrowetting displays, the properties of such pigments in the display will be clear. When the applied electric field is used to move the oil drop containing the pigment particles, the uncharged pigment particles follows the liquid motion. The inks are pigment based rather than the usual dye-based and thus the color fastness is greatly improved. Having light-fast inks provided by this invention enables substantial growth in applications of electronic displays, particularly electrowetting displays.

For those skilled in the art of electrophoretic displays, the advantages of such pigments will also be clear. When the applied electric field is used to move other pigment particles in the oil, the uncharged pigment particles remain and creates a background color state. This is of great advantage in dual particle displays since only one of colors needs to be treated to respond to electric field, a great reduction in complexity.

The above objectives are accomplished according to the present invention by providing ink for an electronic display comprising a carrier liquid; a concentration of pigment particles disposed in said carrier liquid; a surfactant included in said carrier liquid, wherein said surfactant is adsorbed on said pigment particles only when activated; and, wherein said pigment particles having adsorbed said surfactant do not generate a reactive level of particle charge so that said pigment particles move with and not independently from said carrier liquid under an applied electrical field.

In a further advantageous embodiment, the surfactant comprises a block copolymer selected from the group consisting of polystyrene, polyisoprene, ethylene α-olefin copolymers, polymethacrylates, diblock copolymers having a vinyl aromatic segment and a hydrogenated polydiene segment, hydrogenated isoprene linear and star polymers, copolymers of ethylene and propylene monomers, star polymers derived from diene, vinyl aromatic hydrocarbon monomer, and vinyl aromatic/conjugated diene diblock copolymers, and combinations thereof.

In a further advantageous embodiment, the block copolymer includes a first portion having a first chemistry and a second portion having a second chemistry, and wherein one of said first and second chemistries is soluble in said carrier liquid and the other of said first and second chemistries is only soluble in said carrier liquid only when activated, and wherein neither of said first and second chemistries interact with said pigment particles to produce an electric charge.

In a further advantageous embodiment, the first portion of said block copolymer comprises a polyisoprene chain soluble in oil, and said second portion of said block copolymer comprises a polystyrene chain soluble in oil only when activated.

In a further advantageous embodiment, the polystyrene chain is adsorbed to said pigment particles when activated and said polyisoprene chain extends into said carrier liquid.

In a further advantageous embodiment, the carrier liquid is oil.

In a further advantageous embodiment, the oil has a low dielectric constant with a low vapor pressure, a low viscosity, substantially no optical density, and low electrical conductivity.

In a further advantageous embodiment, the concentration of pigment particles includes pigment particles about 0.01 micron diameter to 2 microns in diameter at a concentration from about 0.5% to about 30% by volume.

In a further advantageous embodiment, the surfactant is activated by the application of at least one of heat and solvent to said carrier liquid so that said surfactant molecules adsorb onto said pigment particles.

The above objectives are further accomplished according to the present invention by providing a method for producing inert pigment particles in solution comprising the steps of providing a carrier liquid; adding a concentration of pigment particles to said carrier liquid; adding a surfactant to said carrier liquid, wherein said surfactant is adsorbed on said pigment particles only when activated; and, activating said surfactant by the application of at least one of heat and solvent to said carrier liquid so that said surfactant molecules adsorb onto said pigment particles; whereby said pigment particles with activated surfactants do not generate a reactive level of particle charge so that said pigment particles move with and not independently from said carrier liquid under an applied electrical field.

In a further advantageous embodiment, the method includes the step of milling said pigment particles in said carrier liquid to a desired size.

In a further advantageous embodiment, activating said surfactant includes the step selected from the group consisting of 1) mixing and/or milling pigment particles in said carrier liquid while heating said carrier liquid; 2) mixing and/or milling pigment particles in said carrier liquid with said solvent; 3) mixing and/or milling by intermittent milling where the mixing and/or milling is interrupted, wherein interruptions include changes in temperature and solvent composition of said carrier liquid.

In a further advantageous embodiment, the method includes the step of providing said surfactant in the form of a block copolymer selected from the group consisting of polystyrene, polyisoprene, ethylene α-olefin copolymers, polymethacrylates, diblock copolymers having a vinyl aromatic segment and a hydrogenated polydiene segment, hydrogenated isoprene linear and star polymers, copolymers of ethylene and propylene monomers, star polymers derived from diene, vinyl aromatic hydrocarbon monomer, ethylene α-olefin copolymers, and vinyl aromatic/conjugated diene diblock copolymers, and combinations thereof.

In a further advantageous embodiment, the method includes the step of providing said block copolymer including a first portion having a first chemistry and a second portion having a second chemistry, and wherein one of said first and second chemistries is soluble in said carrier liquid and the other of said first and second chemistries is only soluble in said carrier liquid only when activated, and wherein neither of said first and second chemistries interact with said pigment particles to produce an electric charge.

In a further advantageous embodiment, the method includes providing said first portion of said block copolymer as a polyisoprene chain soluble in oil, and providing said second portion of said block copolymer as a polystyrene chain soluble in oil only when activated, wherein said polystyrene chain adsorbs to said pigment particles when activated.

In a further advantageous embodiment, the carrier liquid is provided as an oil having a low dielectric constant with a low vapor pressure, a low viscosity, substantially no optical density, and low electrical conductivity.

In a further advantageous embodiment, the pigment particles are provided at a concentration from about 0.5% to about 30% by volume.

In a further advantageous embodiment, the method includes heating said surfactant generally to a critical micelle temperature in said carrier liquid so that inverse micelles formed by said surfactant molecules disassociate and adsorb onto said pigment particles.

In a further advantageous embodiment, the method includes adding said solvent to said carrier liquid generally to a critical micelle composition so that inverse micelles formed by said surfactant molecules in said carrier liquid disassociate and adsorb onto said pigment particles.

In a further advantageous embodiment, the method includes selecting said solvent from the group consisting of n-pentane, n-hexane, heptane, octane, decane, dodecane, tetradecane, squalane, Dimethyl formate, Dimethyl acetate, methyl ethyl ketone, diethyl phthalate, dimethyl phthalate, and synthetic hydrocarbons.

BRIEF DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein:

FIGS. 3A-3C show charged, white pigment, uncharged particles of the present invention (for example, cyan) dispersed in an oil and switched between three optical states: white, color of the dye and black;

FIGS. 4A-4B show an uncharged pigment of the present invention used in place of a dye in an electrowetting display. Without voltage the pigment dispersion is spread across the rear hydrophobic layer producing a dark state. With an applied voltage, the pigment dispersion dewets the rear hydrophobic layer producing a white state. Because the pigment is uncharged it follows the motion of the oil and is unaffected by the electric field; and, FIG. 5A-5D show an electrowetting display pixels with ink according to the present invention and capable of four color states shown individually.

Figure 1:
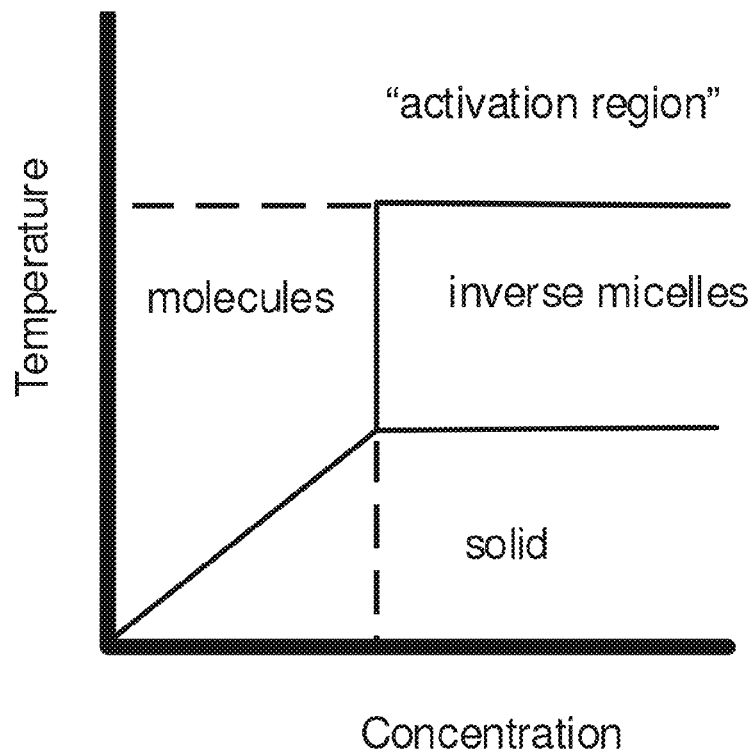
FIG. 1 shows a simplified temperature-concentration phase diagram of a block copolymer in a solvent that preferentially solubilizes one block.

It will be understood by those skilled in the art that one or more aspects of this invention can meet certain objectives, while one or more other aspects can meet certain other objectives. Each objective may not apply equally, in all its respects, to every aspect of this invention. As such, the preceding objects can be viewed in the alternative with respect to any one aspect of this invention. These and other objects and features of the invention will become more fully apparent when the following detailed description is read in conjunction with the accompanying figures and examples. However, it is to be understood that both the foregoing summary of the invention and the following detailed description are of a preferred embodiment and not restrictive of the invention or other alternate embodiments of the invention. In particular, while the invention is described herein with reference to a number of specific embodiments, it will be appreciated that the description is illustrative of the invention and is not constructed as limiting of the invention. Various modifications and applications may occur to those who are skilled in the art, without departing from the spirit and the scope of the invention.

DETAILED DESCRIPTION OF A PREFERRED EMBODIMENT

With reference to the drawings, the invention will now be described in more detail.

The discussion herein describes the invention assuming the pigment particles are dispersed in oil. Oil for purposes of this invention is defined as organic liquids or mixtures with low dielectric constant, low electrical conductivity, low viscosity, clear, and non-volatile. Typical oil is a hydrocarbon mixture with eight to eighteen carbons per molecule.

To those skilled in the art it is thought that oil surfactants are soluble in oil by forming small clusters called inverse micelles. The formation of micelles in solution is a competitive process with adsorption on a pigment surface. For oil surfactant molecules to adsorb on the pigment particle and stabilize, they must be more attracted to the surface than to each other. For this reason, the parts of the known oil surfactant molecules that will attach to the particle surface have strong surfactant-surface interactions that generate a charge to the particle.

The present invention discloses oil-soluble molecules that are an exception to known interaction models and that are particularly useful in making pigment dispersions that have insignificant charge.

A distinguishing feature of these surfactants are that they contain at least two types of chemistry and neither of those chemistries can interact with pigment particle surfaces to produce electric charge. At least one of those types of chemistry is easily soluble in the oil, and, the other of those chemistries is soluble in the oil only when "activated". Activation being the application of heat, solvent, or combinations of both heat and solvent.

An example of a surfactant of the present invention is a block copolymer of polystyrene and polyisoprene. Neither type of chemistry interacts with pigment surfaces to produce electric charge. One of those chemistries is easily soluble in the oil, the polyisoprene. One of those chemistries is not soluble in oil, the polystyrene. The copolymer is soluble in oil when the polyisoprene chain is long enough. The soluble copolymer does not adsorb on pigment surfaces because the polymers in solution form inverse micelles—a structure with the soluble polymer on the outside and the insoluble polymer on the inside. These inverse micelles are so strongly associated that polymer molecules do not break free and adsorb to the pigment particle surface.

However, when the copolymer solution is heated, the strength of the inverse micelle decreases to the point that it disintegrates. This is called the critical micelle temperature. Approaching and above this temperature the copolymer adsorbs on the pigment particle surface. When the pigment particle dispersion is cooled, it is a stable dispersion, stabilized by strongly adsorbed copolymer, with the insoluble polystyrene block adsorbed on the pigment particle surface and the soluble polyisoprene portion extended into the oil phase.

When the temperature is reduced by allowing the material to cool to room temperature, the adsorbed copolymer remains adsorbed and acts as a dispersion stabilizer in which no charges are generated.

As will be shown by examples below, this allows many different kinds of pigment particles to be dispersed in oil, all with the same "activated" surfactant, and no pigment particles with significant electric charge. The general idea is that 1) When activated-surfactants are added to carrier liquid and pigment particle mixtures, the surfactant molecules are not significantly adsorbed by the pigment particles; 2) The surfactants are "activated" when processing conditions are changed to release surfactant molecules from inverse micelles into solution (examples of changing conditions to activate the surfactants are changes in temperature and/or solvent composition); 3) When the surfactants are activated then they are free to be adsorbed by the pigment particles; 4) When the surfactant covered particle dispersion is returned to room temperature, or when the solvent composition is returned to pure oils, the adsorbed surfactant molecules remain strongly attached (the adsorbed activated-surfactant molecules prevent pigment particles from flocculation); and, 5) The copolymers are anchored to the surface of the pigment particles because it is not soluble in the oil—not because of any chemical reaction. Hence the pigment particles remain uncharged.

This process can be illustrated on a polymer-solution phase diagram. FIG. 1 shows a phase diagram for an activated-surfactant like the styrene-co-isoprene block copolymer just described. In the region marked "molecules" the temperature is high enough and the concentration low enough that the block copolymer is soluble as molecules. For most block copolymers this is a concentration so low as to be nearly immeasurable or, at the least, far too low to provide enough molecules to cover the surfaces of particles. In the region marked "inverse micelles", the temperature is high enough and the concentration high enough that the surfactant molecules are in solution but all aggregated into inverse micelles. Inverse micelles do not adsorb onto particle surfaces and do not stabilize dispersions. Then, if a mixture of copolymer and pigment particles in the region marked "inverse micelles" is heated into the region above, labeled as "activated region", the inverse micelles disassociate and the individual molecules are adsorbed by pigment particle surfaces. When the dispersion is cooled again, the adsorbed polymer remains and acts as a surfactant stabilizer. The activation region is a range of temperatures and concentrations where the oil surfactants are more likely to be adsorbed onto the pigment particles than be associated into inverse micelles.

Surfactants:

Examples of surfactants that can be activated include a block copolymer selected from the group consisting of polystyrene, polyisoprene, ethylene α-olefin copolymers, polymethacrylates, diblock copolymers having a vinyl aromatic segment and a hydrogenated polydiene segment, hydrogenated isoprene linear and star polymers, copolymers of ethylene and propylene monomers, star polymers derived from diene, optionally, vinyl aromatic hydrocarbon monomer, and vinyl aromatic/conjugated diene diblock copolymers.

The ink may be used in various electronic displays including inks for electrowetting displays, inks for electrophoretic displays, black matrixes for liquid crystal displays, pigment-based color filters for liquid crystal displays, as well as in various nanoparticle dispersions. The inks can be activated by temperature and solvent composition.

Oils:

Useful low dielectric constant, low conductivity, low viscosity oils are hydrocarbons are the Isopar® and Norpar® series of hydrocarbons from Exxon, the Shell-Sol® and Shell-Trol® series from Shell, decane, dodecane, tetradecane, naptha and other low viscosity petroleum solvents.

Pigment Particles:

Useful pigments include, PbCr04, Cyan blue GT 55-3295 (American Cyanamid Company, Wayne, N.J.), Cibacron Black BG (Ciba Company, Inc., Newport, Del.), Cibacron Turquoise Blue G (Ciba), Cibalon Black BGL (Ciba), Orasol Black BRG (Ciba), Orasol Black RBL (Ciba), Acetamine Blac, CBS (E. I. du Pont de Nemours and Company, Inc., Wilmington, Del.), Crocein Scarlet N Ex (duPont) (27290), Fiber Black VF (dupont) (30235), Luxol Fast Black L (dupont) (Solv. Black 17), Nirosine Base No. 424 (duPont) (50415 B), Oil Black BG (dupont) (Solv. Black 16), Rotalin Black RM (duPont), Sevron Brilliant Red 3 B (duPont); Basic Black DSC (Dye Specialties, Inc.), Hectolene Black (Dye Specialties, Inc.), Azosol Brilliant Blue B (GAP, Dyestuff and Chemical Division, Wayne, N.J.) (Solv. Blue 9), Azosol Brilliant Green BA (GAP) (Solv. Green 2), Azosol Fast Brilliant Red B (GAP), Azosol Fast Orange RA Conc. (GAP) (Solv. Orange 20), Azosol Fast Yellow GRA Conc. (GAP) (13900 A), Basic Black KMPA (GAP), Benzofix Black CW-CF (GAP) (35435), Cellitazol BNFV Ex Soluble CF (GAP) (Disp. Black 9), Celliton Fast Blue AP Ex Conc (GAP) (Disp. Blue 9), Cyper Black IA(GAP) (Basic Blk. 3), Diamine Black CAP Ex Conc (GAP) (30235), Diamond Black EAN Hi Con. CF (GAP) (15710), Diamond Black PBBA Ex (GAP) (16505); Direct Deep Black EA Ex CF (GAP) (30235), Hansa Yellow G (GAP) (11680); Indanthrene Black BBK Powd. (GAP) (59850), Indocarbon CLGS Conc. CF (GAP) (53295), Katigen Deep Black NND Hi Conc. CF (GAP) (15711), Rapidogen Black 3 G (GAP) (Azoic Blk. 4); Sulphone Cyanine Black BA-CF (GAP) (26370), Zambezi Black VD Ex Conc. (GAP) (30015); Rubanox Red CP-1495 (The Sherwin-Williams Company, Cleveland, Ohio) (15630); Raven 11 (Columbian Carbon Company, Atlanta, Ga.), (carbon black aggregates with a particle size of about 25 um), Statex B-12 (Columbian Carbon Co.) (a furnace black of 33 um average particle size), and chrome green.

Carbon blacks from Cabot Corporation are also useful, including low structure blacks such as Mogul L and Black Pearls L, medium structure blacks such as Monarch 700 and Black Pearls 700, and high structure blacks such as Vulcan XC72R and Vulcan XC72.

Pigments may also include laked, or dyed, pigments. Laked pigments are particles that have a dye precipitated on them or which are stained. Lakes are metal salts of readily soluble anionic dyes. These are dyes of azo, triphenylmethane or anthraquinone structure containing one or more sulphonic or carboxylic acid groupings. They are usually precipitated by a calcium, barium or aluminium salt onto a 10 substrate. Typical examples are peacock blue lake (CI Pigment Blue 24) and Persian orange (lake of CI Acid Orange 7), Black M Toner (GAP) (a mixture of carbon black and black dye precipitated on a lake).

Manufacturing:

In one embodiment, the surfactant can be activated using heat. In this method, the oil, pigment particles, and the activatable surfactant are added to a media mill such as an attritor, ball mill, sand mill, either vertical or horizontal, batch or continuous or circulating. It is easiest to make a pre-mix as is usual when handling pigment powders. The surfactants are often difficult to dissolve in the carrier liquid, in this case oil, so a separate step to make a concentrate is recommended. Making the concentrate can be done at higher temperatures. The dispersion is heated while milling to a temperature near and above the critical micelle temperature. The milling is continued until the pigment particle size is sufficiently small. It is wise to allow plenty of time for adsorption of the activated surfactant, either while milling hot or, while letting the batch cool slowly to room temperature.

In an alternative embodiment, the surfactant can be activated using solvent. When using solvent, the structure of the copolymer affects the solvents ability to disassociate the inverse micelles. When using solvent, the critical micelle composition is defined as the point when the inverse micelles disassociate to allow the surfactant to bind to the pigment particles. In one example, for a solution of block copolymers of polystryene and polyisoprene having micelles with polyisoprene cores and polystryene halos in Dimethyl formate (2, 7), Dimethyl acetate (7), and Methy ethyl ketone (7), diethyl phthalate (3, 4), dimethyl phthalate (4), the addition of alkanes: n-pentane, n-hexane, heptane, octane, decane, dodecane, tetradecane, or squalane would "activate" the micelles at the critical micelle composition. Alternatively, in a solution of block copolymers of polystryene and polyisoprene having micelles with polystryene cores and polyisoprene halos in alkanes: n-pentane (6), n-hexane (1), heptane(2,7), octane (7), decane (2,5,7), dodecane (7), tetradecane (3, 4), squalane (4), the addition of Dimethyl formate, Dimethyl acetate, Methy ethyl ketone, diethyl phthalate, or dimethyl phthalate would "activate" the micelles at the critical micelle composition.

If the activation was by use of mixed solvents, the extra solvent may need to be removed slowly to allow adsorption of the activated surfactant to be complete. Further, activation can involve both heat and solvent. The general principle is that more heat requires less solvent; more solvent would require less heat. The trade-off would take into account equipment, rates of heating and cooling, solvent addition rates, rates of cooling and solvent removal for a given application. Not all the solvent may need to be removed; possibly none has to be removed, depending on the requirements of the final dispersion. As a practical consideration, filtration is also wise.

When the formulation is correct—sufficient activated surfactant is used to stabilize the pigment particles—then the cleaning of the equipment is surprisingly easy. The shot is clean with a simple rinse in solvent.

Ink Properties:

Inks of the present invention are a concentration of pigment particles of about 0.01 micron diameter to 2 microns in diameter at a concentration from about 0.5% to about 30% by volume. The inks are provided in a carrier liquid have a low dielectric constant with a low vapor pressure, a low viscosity, substantially no optical density, and low electrical conductivity. The inks include activated surfactants on the pigment particles as described above that disperse the pigment particles in the oil, that do not generate a reactive level of particle charge. Further, the pigment particles do not alter the dielectric constant, vapor pressure, viscosity, optical density or electrical conductivity of the carrier liquid so that said pigment particles move with and not independently from said carrier liquid under an applied electrical field. The activation process can be selected from the following: 1) mixing and/or milling pigment particles in said carrier liquid while heating said carrier liquid; 2) mixing and/or milling pigment particles in said carrier liquid with said solvent; 3) mixing and/or milling by intermittent milling where the mixing and/or milling is interrupted, wherein interruptions include changes in temperature and solvent composition of said carrier liquid.

In one embodiment, the carrier liquid has a dielectric constant of less than 80, and preferably less than 2; a high boiling point of greater than 100° C., and preferably greater than 160° C.; a fluid viscosity of less than 100 mPa-s, and preferably less than 2 mPa-s; a transparent optical density of less 0.10/micron, and preferably less than 0.01/micron; and, an insulating electrical conductivity of less than 100 pS/cm, and preferably 2 pS/cm.

These components can also be included in inks that do contain charged pigment particles of other colors. More than one type of pigment particle can be included to achieve other colors.

The inks of the present invention can be combined with aqueous phases as in electrowetting displays (EWDs) to fill pixels. The inks of the present invention can be combined with charged pigment particles of other colors, emulsified and encapsulated to use as electronic ink.

Figure 2:
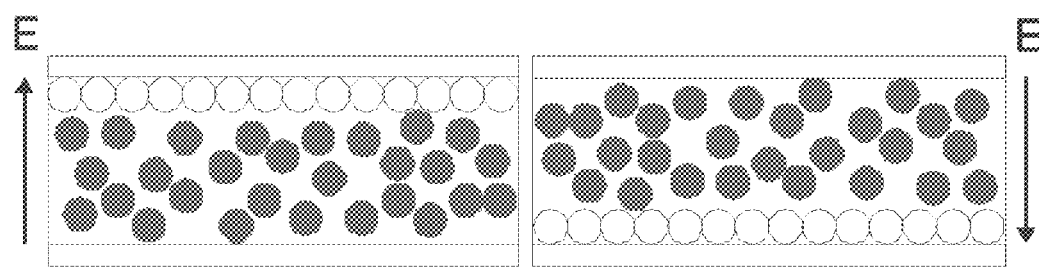
FIG. 2 shows an EPD with one color pigment particles charged (for example, white) and another color pigment particles uncharged (for example, cyan)

Device designs for which the inks of the present invention are appropriate:

1) Electrophoretic displays (EPDs) with two optical states using one color charged pigment particles and one color uncharged pigment particles of the present invention:

Referring to FIG. 2, charged white pigment particles are shown dispersed in oil with uncharged pigment particles of the present invention in a second color. When the white pigment particles are on the viewing side (in FIG. 2, viewing is from above), the pixel appears white. When the white pigment particles are moved to the back of the pixel by reversing the electric field, the pixel appears the color of the pigment particles. An advantage of using the uncharged pigment particles of the present invention is that the dye currently used in EPDs, which fades with light exposure, is replaced with a pigment having light stability.

Another important advantage of using the uncharged pigment particles of the present invention is when the pigment particles are black, for example carbon black particles. The optical states would be a white state and black state, with exceptionally high optical contrast, ideal for readers. The light stability of black pigment like carbon black far exceed the light stability of black dyes.

Another advantage using the uncharged pigment particles of the present invention in devices as illustrated here is that the uncharged pigment particles are excluded from the layer of charged particles on the viewing electrode. This is not true for dye solutions which fill the interstices between the white particles and greatly diminish the brightness of the pixel.

2) EPDs with three optical states using only one charged pigment particles and one uncharged pigment particles of the present invention:

Referring to FIGS. 3A-3C, the inks of the present invention can be made to create three optical states. For example, when the charged pigments are white, the back surface is black, and uncharged pigments of the present invention are used. The display of FIGS. 3A-3C has three optical states, white (FIG. 3A), the color of the uncharged pigment particles (FIG. 3B), and black (FIG. 3C).

The pixel design shown in FIGS. 3A-3C is sometimes called "in-plane" switching as is known to those skilled in the art. Many possible arrangements of three electrodes are possible. The uncharged pigment particles of the present invention enable great simplifications of ink designs. For example the ink designer could design a white pigment with the proper materials properties and combine it with a variety of colors of uncharged pigments of the present invention to create a display of many colors.

This design is on a route to a full color display, capable of bright white states and dark black states, important for reading because all pixels can be changed black or white. A mixture of pixels of various colors would have equivalent color gamut to color filter arrays of current EPD color displays. Hence the pigment particles of the present invention provide a means to improve the color of current dual particle displays substantially.

3) EWDs with pigment particles of the present invention in place of dyes:

The dye of the common EWD can be replaced with particles of the present invention to produce a light-fast EWD as shown in FIGS. 4A-4B in which the pigment particles move with the oil. The pixel includes a pixel wall 10, pigmented oil 20 according to the present invention, hydrophobic layer 30, and transparent electrode 40. Black and white displays are the most generally useful displays. Black dyes are generally not sufficiently light-fast so displays using dyes are generally not available with black and white states. However the uncharged pigment particles of the present invention enable light-fast EWD displays by the use of black pigments in oil, for example carbon black, as the black.

4) EWDs with multiple color states using pigment particles of the present invention in place of dyes:

Many designs have been proposed for EWD pixels with multiple color states, generally demonstrating the idea with dyed oils. The uncharged pigment particles of the present invention can be used in the same designs to advantage, particularly in light-fastness, but also in higher optical densities.

Figure 5A:
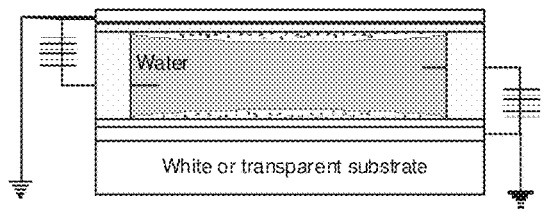
Figure 5B:
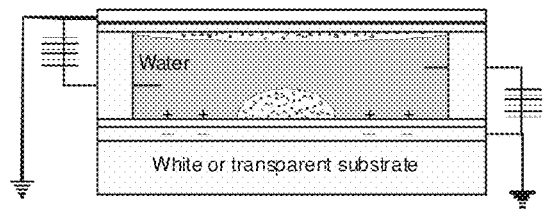
Figure 5C:
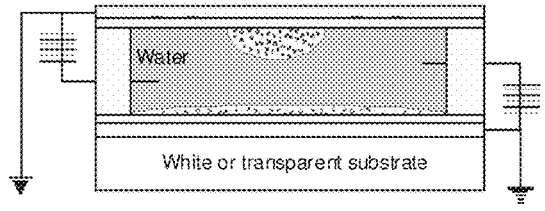
Figure 5D:
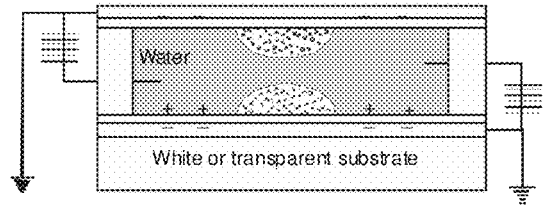

The pixel design of FIGS. 5A-5D can be topped with an ink layer of a different color on a hydrophobic layer on a transparent electrode connected to separate switches to produce the pixel. Each side of the pixel can be switched independently. FIG. 5A shows neither switch on. FIG. 5B shows the lower switch on. FIG. 5C shows the upper switch on. FIG. 5D shows both upper and lower switches on.

5) Color matching with uncharged pigment particles of the present invention:

The uncharged pigment particles of the present invention are never the less stable dispersions in oils. Those properties make mixtures of different colors stable dispersions. Particular shades of color, often color matching, sometimes for branding needed. Dispersions of a primary set of shades of colors can be prepared and mixtures of them used to provide the needed shades and hues.

Examples of dispersions of uncharged pigment inks of the present invention:

1) Yellow ink for EWD (89A)

A 3% by weight solution of block polystyrene-co-polyisoprene was prepared in light mineral oil. 24 gm of this solution, 12 gm of a yellow pigment, and 164 gm of Isopar G® were combined at room temperature, poured into an attritor with $\frac{1}{8}^{th}$ inch carbon steel shot, and heated with stirring (about 100 RPM) to 97° C. in 2 hours. The sample was milled for about 90 minutes and allowed to cool. After 4 hours the heating and stirring were restarted, the sample heated to 96° C., the milling stopped after 2 and ⅓ hours, the dispersion removed (recovering 147 gm of ink). Several days later the ink was tested in a simple EWD test cell and shown to switch on and off.

2) Red ink for EWD (90A)

A 3% by weight solution of block polystyrene-co-polyisoprene was prepared in light mineral oil. 24 gm of this solution, 12 gm of a red pigment, and 164 gm of Isopar G® were combined at room temperature, poured into an attritor with $\frac{1}{8}^{th}$ inch carbon steel shot, and heated with stirring (about 100 RPM) to 97° C. The sample was milled for 5 hours and then removed from the attritor (recovering 155 gm of ink). Several days later the ink was tested in a simple EWD test cell and shown to switch on and off.

3) Black ink for EWD (116D)

A 3% by weight solution of block polystyrene-co-polyisoprene was prepared in light mineral oil. 60 gm of this solution, 6 gm of carbon black (BP 700 from Cabot Corporation), and 134 gm decane were combined at room temperature, poured into an attritor with $\frac{1}{8}^{th}$ inch carbon steel shot, and heated with stirring (about 100 RPM) to 97° C. After 4 hours the sample was removed from the attritor (recovering 151 gm of ink). The same day the ink was tested in a simple EWD test cell and shown to switch on and off.

4) Carbon Black Ink Solvent Activation 150 gm of Isopar G® is added to a 1 liter attritor filled with 3 mm Carbon-steel shot. To the solvent is added 25 gm of carbon black and 10 gm of polystyrene-b-polyisoprene. The milling is started and the dispersion milled for 1 hour at ambient temperature. The temperature in the mill rises to about 30° C. with the energy of the milling. At that time 50 gm of toluene is added and the milling continued for 6 hours. Afterward the dispersion is transferred to a rotary evaporator and the toluene removed. This solvent activation enables the production of a well-dispersed carbon black ink with acceptable physical properties especially low viscosity, high optical density, low electrical conductivity.

While a preferred embodiment of the invention has been described using specific terms, such description is for illustrative purposes only, and it is to be understood that changes and variations may be made without departing from the spirit or scope of the following claims.

What is claimed is:

1. Ink for an electronic display, said ink comprising:
   a carrier liquid responsive to an applied electrical force so that said carrier fluid is selectively movable within a display;
   a concentration of pigment particles disposed in said carrier liquid;
   a surfactant included in said carrier liquid, wherein a majority of said surfactant is adsorbed on said pigment particles when activated; and,
   wherein said pigment particles having adsorbed said surfactant do not generate a reactive level of particle charge so that said pigment particles are uncharged to a level that said pigment particles do not move independently from or within said carrier liquid in response to an applied electrical force; and,
   whereby, movement of said carrier liquid in response to an applied electrical force causes a change in optical state of said display by said pigment particles following the motion of said carrier liquid and being unaffected by said applied electric force.

2. The ink of claim 1, wherein said surfactant comprises a block copolymer selected from the group consisting of polystyrene, polyisoprene, ethylene α-olefin copolymers, polymethacrylates, diblock copolymers having a vinyl aromatic segment and a hydrogenated polydiene segment, hydrogenated isoprene linear and star polymers, copolymers of ethylene and propylene monomers, star polymers derived from diene, vinyl aromatic hydrocarbon monomer, and vinyl aromatic/conjugated diene diblock copolymers, and combinations thereof.

3. The ink of claim 2, wherein said block copolymer includes a first portion having a first chemistry and a second portion having a second chemistry, and wherein one of said first and second chemistries is soluble in said carrier liquid and the other of said first and second chemistries is only soluble in said carrier liquid only when activated, and wherein neither of said first and second chemistries interact with said pigment particles to produce an electric charge.

4. The ink of claim 3, wherein said first portion of said block copolymer comprises a polyisoprene chain soluble in oil, and said second portion of said block copolymer comprises a polystyrene chain soluble in oil only when activated.

5. The ink of claim 4, wherein said polystyrene chain is adsorbed to said pigment particles when activated and said polyisoprene chain extends into said carrier liquid.

6. The ink of claim 1, wherein said carrier liquid is oil.

7. The ink of claim 6, wherein said oil has a low dielectric constant with a low vapor pressure, a low viscosity, substantially no optical density, and low electrical conductivity.

8. The ink of claim 1, wherein said concentration of pigment particles includes pigment particles about 0.01 micron diameter to 2 microns in diameter at a concentration from about 0.5% to about 30% by volume.

9. The ink of claim 1, wherein said surfactant is activated by the application of at least one of heat and solvent to said carrier liquid so that said surfactant molecules adsorb onto said pigment particles.

10. A method for producing ink for use in an electrowetting display comprising the steps of:
    providing a carrier liquid responsive to an applied electrical force so that said carrier fluid is selectively movable within a display;
    adding a concentration of pigment particles to said carrier liquid;
    adding a surfactant to said carrier liquid, wherein said surfactant is adsorbed on said pigment particles when activated; and,
    activating said surfactant by the application of at least one of heat and solvent to said carrier liquid so that said surfactant molecules adsorb onto said pigment particles;
    whereby said pigment particles with activated surfactants do not generate a reactive level of particle charge so that said pigment particles are uncharged to a level that said pigment particles do not move independently from or within said carrier liquid in response to an applied electrical force; and,
    whereby, movement of said carrier liquid in response to an applied electrical force causes a change in optical state of said display by said pigment particles following the motion of said carrier liquid and being unaffected by said applied electric force.

11. The method of claim 10, including the step of milling said pigment particles in said carrier liquid to a desired size.

12. The method of claim 11, wherein activating said surfactant includes the step selected from the group consisting of 1) mixing and/or milling pigment particles in said carrier liquid while heating said carrier liquid; 2) mixing and/or milling pigment particles in said carrier liquid with said solvent; 3) mixing and/or milling by intermittent milling where the mixing and/or milling is interrupted, wherein interruptions include changes in temperature and solvent composition of said carrier liquid.

13. The method of claim 10, including the step of providing said surfactant in the form of a block copolymer selected from the group consisting of polystyrene, polyisoprene, ethylene α-olefin copolymers, polymethacrylates, diblock copolymers having a vinyl aromatic segment and a hydrogenated polydiene segment, hydrogenated isoprene linear and star polymers, copolymers of ethylene and propylene monomers, star polymers derived from diene, vinyl aromatic hydrocarbon monomer, and vinyl aromatic/conjugated diene diblock copolymers, and combinations thereof.

14. The method of claim 13, including the step of providing said block copolymer including a first portion having a first chemistry and a second portion having a second chemistry, and wherein one of said first and second chemistries is soluble in said carrier liquid and the other of said first and second chemistries is only soluble in said carrier liquid only when activated, and wherein neither of said first and second chemistries interact with said pigment particles to produce an electric charge.

15. The method of claim 13, including providing said first portion of said block copolymer as a polyisoprene chain soluble in oil, and providing said second portion of said block copolymer as a polystyrene chain soluble in oil only when activated, wherein said polystyrene chain adsorbs to said pigment particles when activated.

16. The method of claim 10, wherein said carrier liquid is provided as an oil having a low dielectric constant with a low vapor pressure, a low viscosity, substantially no optical density, and low electrical conductivity.

17. The method of claim 10, wherein said pigment particles are provided at a concentration from about 0.5% to about 30% by volume.

18. The method of claim 10, including heating said surfactant generally to a critical micelle temperature in said carrier liquid so that inverse micelles formed by said surfactant molecules disassociate and adsorb onto said pigment particles.

19. The method of claim 10, including adding said solvent to said carrier liquid generally to a critical micelle composition so that inverse micelles formed by said surfactant molecules in said carrier liquid disassociate and adsorb onto said pigment particles.

20. The method of claim 10, including selecting said solvent from the group consisting of n-pentane, n-hexane, heptane, octane, decane, dodecane, tetradecane, squalane, Dimethyl formate, Dimethyl acetate, methyl ethyl ketone, diethyl phthalate, dimethyl phthalate, and synthetic hydrocarbons.

* * * * *